United States Patent
Dickens et al.

(10) Patent No.: US 8,274,502 B2
(45) Date of Patent: Sep. 25, 2012

(54) VIDEO SWITCH AND METHOD OF SAMPLING SIMULTANEOUS VIDEO SOURCES

(75) Inventors: Nigel Anthony Dickens, Cambridge (GB); William Haylock, St. Ives (GB)

(73) Assignee: Adder Technology Limited, Cambridge (GB)

( * ) Notice: Subject to any disclaimer, the term of this patent is extended or adjusted under 35 U.S.C. 154(b) by 960 days.

(21) Appl. No.: 12/021,176

(22) Filed: Jan. 28, 2008

(65) Prior Publication Data

US 2008/0195777 A1 Aug. 14, 2008

(30) Foreign Application Priority Data

Feb. 8, 2007 (GB) .................................. 0702439.1

(51) Int. Cl.
*G06F 3/038* (2006.01)
(52) U.S. Cl. ........................... 345/213; 710/73; 348/705
(58) Field of Classification Search .................... 345/213
See application file for complete search history.

(56) References Cited

U.S. PATENT DOCUMENTS

| 6,316,974 B1 | 11/2001 | Taraci et al. | |
|---|---|---|---|
| 6,633,905 B1* | 10/2003 | Anderson et al. | 709/219 |
| 2003/0044042 A1* | 3/2003 | King et al. | 382/100 |
| 2003/0191850 A1 | 10/2003 | Thornton | |
| 2005/0132087 A1 | 6/2005 | Glinski et al. | |
| 2006/0267695 A1* | 11/2006 | Keating | 331/16 |
| 2008/0007549 A1* | 1/2008 | Huang et al. | 345/213 |
| 2008/0136828 A1* | 6/2008 | Chang | 345/520 |

FOREIGN PATENT DOCUMENTS

| GB | 2426650 | 11/2006 |
|---|---|---|
| JP | 56-109075 | 8/1981 |
| WO | WO 2005/029861 | 3/2005 |

OTHER PUBLICATIONS

UK Search Report for corresponding GB Application No. 0702439.1, May 22, 2008.
Search Report and Search Opinion in corresponding EP Application No. EP 08151074, dated Jun. 25, 2009.

* cited by examiner

*Primary Examiner* — Alexander Eisen
*Assistant Examiner* — Robin Mishler
(74) *Attorney, Agent, or Firm* — Beyer Law Group LLP

(57) ABSTRACT

A video switch for allowing at least two users to view video data from respective ones of at least two video sources. The video switch comprises a switch for selecting one of the at least two video sources and at least one sampler connected to the switch. The sampler is for sampling video data from the at least two video sources. The video switch further comprises a controller for controlling the switch and sampler to select one of the at least two video sources and sample a frame of video data. An output is provided for transmitting video data to one of the at least two users. The output supports a maximum number of simultaneous users which is at least two, and the number of samplers in the video switch is less than the maximum number of simultaneous users.

A video switch according to the present invention allows a sampler for capturing video data to be shared between at least two simultaneous users. This reduces the cost, size and complexity of the hardware required to implement a video switch. In one embodiment of the invention, the sampler may comprise a programmable Phase Locked Loop which can optionally have a fast lock mode.

14 Claims, 4 Drawing Sheets

VIDEO SWITCH AND METHOD OF SAMPLING SIMULTANEOUS VIDEO SOURCES

FIELD OF INVENTION

The present invention relates to a video switch and a method of sampling simultaneous video sources. In particular, it relates to a video switch and method in which one sampler can be used to sample at least two simultaneous video sources. The video switch and method can be used in Keyboard, Video and Mouse (KVM) switches.

BACKGROUND OF THE INVENTION

Traditional Keyboard, Video and Mouse (KVM) switches, such as the SmartView XPro which is commercially available from Adder Technology Limited, are used to connect one or more KVM user stations, including a keyboard, video display and mouse to a plurality of computers so that one or more users can control a selected one of the plurality of computers. Multi-user KVM switches enable two or more users to independently control different computers at the same time.

KVM-via-IP devices, such as the AdderLink IP which is commercially available from Adder Technology Limited, may be used together with KVM switches to enable the computers to be controlled from a remote viewer, such as a VNC viewer commercially available from RealVNC Limited. The remote viewer software runs on a remote computer that is connected to the KVM-via-IP device by means of a local area or wide area network connection.

The main function of KVM-via-IP devices is to convert video, keyboard and mouse signals to and from network traffic in a manner that enables the user of the remote viewer to interact with the target computer as if they were using a keyboard, monitor and mouse connected directly to the target computer. FIG. 1 shows a typical arrangement of a prior art KVM-via-IP appliance (such as an AdderLink IP) connected to a multi-user KVM switch (such as a SmartView XPro). Using the arrangement shown, user A can be controlling computer 1 whilst user B is controlling computer 2. KVM-via-IP devices are sometimes also referred to as KVM-over-IP devices. When embedded into other devices the KVM-via-IP circuitry is sometimes also known as a "KVM-via-IP engine", a "KVM-over-IP engine" or an "IP engine".

The KVM-via-IP device works by capturing the incoming video signal and storing pixel values in its memory. The pixel data is then processed by a microprocessor which is typically able to identify changes in the pixel data between successive sampled video frames. The microprocessor encodes the pixel data and sends it via the network to the remote viewer. Keyboard and mouse data arriving from the viewer via the network is sent to the target computer via the keyboard and mouse links.

Higher end KVM switches, such as the AdderView CATx IP commercially available from Adder Technology Limited, often combine the functionality of a KVM-via-IP device and a KVM switch into a single product offer, known as an IP-enabled KVM switch. Such products may be used by medium and larger sized enterprises to conveniently control many computers.

These enterprises may have several system administrators and from time to time may require two or more users to be accessing different computers connected to the same KVM switch at the same time. To meet this requirement, an IP-enabled KVM switch must support multiple simultaneous users sessions whereby video from a first computer is delivered to a first remote user whilst video from a second computer is simultaneously delivered to a second remote user. Products that perform this function may be described as IP-enabled multi-user KVM switches.

An IP-enabled multi-user KVM switching system can be built by connecting multiple KVM-via-IP devices to the user ports of a multi-user KVM switch as shown in FIG. 1. However, in practice it is often more convenient to combine the KVM-via-IP and KVM switching functionality into an IP-enabled multi-user KVM switch.

A conceptual structure of a prior art IP-enabled multi-user KVM switch is shown in FIG. 2. Prior art multi-user IP-enabled KVM switches are commonly provided with a range of other features such as ports for the connection of a local keyboard, monitor and mouse, on screen display circuitry and circuitry for transmitting KVM signals over CATx (CAT 5,5e,6 etc) style cables. The implementation of such features is known to those skilled in the art and so for clarity of explanation, these extra features are not shown on FIG. 2. To avoid cable clutter in server rooms, Enterprise grade KVM switches, such as the AdderView CATx IP, typically use a small dongle to connect to the computer and a CATx cable to connect the dongle to the KVM switch. Again, this is omitted from FIG. 2 for clarity but those skilled in the art will readily appreciate that the device can be used either together with such dongles or not. FIG. 2 shows separate keyboard, video and mouse links for each computer for clarity of explanation but in many prior art systems, these signals are carried over a single cable terminated by a single connector.

The prior art IP-enabled multi-user KVM switch 200 is connected to multiple computers 201-204 via keyboard/mouse cables 205-208 and video cables 209-212. A central microprocessor 213 is in communication with a flash memory 215 and SDRAM memory 214 via busses 216 and 217 in a conventional manner. A Media Access Control device (MAC) 219, physical layer device (PHY) 220, which converts digital signals into signals required for transmission over the Ethernet network and vice versa, and magnetics 221, which provide a suitable interface for the transmission cables, are used to interface the microprocessor with the Ethernet network 222 that in turn is connected to computers 223 to 226 in a typical arrangement. The microprocessor reads its program data out of the flash memory and executes an embedded Linux operating system and a server program 218 utilising SDRAM memory 214. The server program communicates with client viewer software 227-230 running on remote computers 223-226 in a manner that enables keyboard, video and mouse signals to be transferred between the server software and the client software. Different prior art systems use different server and client software but the Enterprise VNC server and viewer programs commercially available from RealVNC Limited and used in the AdderLink IP are representative of such software programs.

The microprocessor 213 is in communication with a keyboard and mouse signalling circuit 231 via bus 216. Such circuits are commonly implemented using FPGAs such as Xilinx Spartan devices. The circuit is arranged so that keyboard and mouse data can be sent to each of the computers (1,2,3,4) from the microprocessor 213 in a manner that appears to be simultaneous from the point of view of the users A, B, C and D. This is achieved because bus 216 is much faster than the keyboard and mouse data and so the data for users A, B, C and D may be sent sequentially over bus 216 without noticeable delay.

The red, green and blue analogue colour signals and their associated horizontal and vertical synchronisation signals (232-235) are supplied from each computer 201-204 to a cross-point video switching circuit 236. The cross-point switching circuit is arranged so that any chosen output (237-240) may be connected to any of the available inputs (232-235). For illustrative purposes, FIG. 2 shows 4 inputs and 4 outputs but, in practice, the number of inputs is usually rather larger than the number of outputs, a typical arrangement being 4 outputs (to service 4 simultaneous users) and 16 inputs (to service 16 computers). The video routing is selected from the microprocessor 213 using signalling means 241.

A video processing engine (e.g. 241) is provided for each simultaneous remote user. In FIG. 2, four simultaneous IP sessions are supported and so four video processing engines are provided (241 to 244). Each of these video processing engines operates in a similar manner. Each video processing engine (e.g. 241) is fitted with an Analogue Front End (AFE) 245 and an FPGA 246. Separate FPGAs are shown 246,247, 248,249 but conceptually the arrangement would be no different if the logic in each FPGA were in fact implemented in one large FPGA. The FPGA 246 is in communication with memories 250 and 251.

Each video processing engine works in a manner that is similar to sections of the AdderLink IP device commercially available from Adder Technology Limited. The incoming horizontal and vertical signals are fed into the FPGA 246. Logic within the FPGA counts the number of horizontal synchronisation pulses in a vertical synchronisation pulse and the number of vertical synchronisation pulses per second. The microprocessor 213 reads this information and compares it against a table of known video modes. Using a lookup table, the microprocessor 213 writes the relevant settings to the AFE 245 via the FPGA 246 that enable the AFE to capture the incoming video signals 237 and convert them into digital samples of the pixels 252. The FPGA transfers this digital pixel data into a selected one of the memories 251 or 252 whilst comparing the data with the video data previously sampled, which is held in the other memory 251,252. At the end of each video sample, the memories are switched over. The microprocessor 213 can read the differences between the two memories via the FPGA and can thus identify areas of the screen that have changed by more than a defined noise threshold. This information is used by the server software 218 to transmit mainly video change data to the client software therefore avoiding using unnecessary network bandwidth sending video data that has not significantly changed.

In order to service the multiple simultaneous user sessions, the prior art multi-user IP enabled KVM switch 200 uses a separate video processing engine (e.g. 241) for each simultaneous user. It can therefore be seen that for each of users A, B, C and D to be separately and independently using different computers 1,2,3,4 (for example, A uses 1 whilst B uses 2 whilst C uses 3 whilst D uses 4) with a prior art KVM switch it is necessary for each simultaneous user to be serviced by a dedicated video processing engine with a separate AFE. In the example shown in FIG. 2, the four users A, B, C and D require the four video processing engines 241,242,243, and 244.

It is desirable to simplify the construction of a video switch or a KVM switch that can support two or more simultaneous users.

SUMMARY OF THE INVENTION

According to a first aspect, the present invention provides a video switch for allowing at least two users to view video data from respective ones of at least two video sources. The video switch comprises:

a switch for selecting one of the at least two video sources;
at least one sampler connected to the switch for sampling video data from the at least two video sources;
a controller for controlling the switch and the sampler to select one of the at least two video sources and sample a frame of the video data from the selected video source; and
an output for transmitting video data to one of the at least two users, wherein the output supports a maximum number of simultaneous users, which is at least two, and the number of samplers in the video switch is less than the maximum number of simultaneous users.

The switch may be a discrete dedicated device or may be implementing using logic in an IC, for example in an FPGA. The sampler may be any suitable device for sampling or capturing video data, in one embodiment the sampler is part of Analogue Front End (AFE). The controller may be a microprocessor, FPGA, ASIC or other integrated circuit. The output may comprise a network interface, with may use a wired or wireless connection and can be for connection to a Wide Area Network or a Local Area Network, alternatively the output could comprise one or more connectors for a user or users to connect directly to the video switch. In another embodiment, the video switch may further comprise more than one input port or connector, with each input port or connector for connection to a video source.

The present invention allows a sampler for capturing video data to be shared between at least two simultaneous users. This has several advantages. The sampler is typically an analog circuit which is expensive and costly to implement. By using less samplers than the number of users, the cost, size and complexity of the hardware required to implement the invention is reduced. The sampler may be part of an Analog Front End (AFE), AFEs are relatively expensive devices so reducing the number of AFEs required is clearly advantageous. Alternatively, the sampler may be part of digital video receiver, for use with a digital video interface, such as DVI or HDMI, which is also a relatively expensive device.

In addition, complex cross-point video switching circuits are expensive and so reducing the requirement to switch multiple inputs to multiple outputs is also advantageous because simpler and cheaper video switching circuitry may be used. For example, in one embodiment the switch is a single output switch.

Product size is a factor that is becoming more important as the space in data centres and server rooms is a valuable commodity. The present invention enables smaller hardware devices to be constructed. There are also benefits for the power consumption of the video switch, which is an important consideration, particularly in air conditioned data centres where the heat generated by equipment requires further power to be applied to the air conditioning to remove the heat from the data centre. The present invention allows the power efficiency for a given functionality level to be improved.

The video switch of invention provides a practical solution to the problem of sharing a single AFE between multiple users. It allows use of a switching technique to switch between video sources in sequence sampling video data from each source in turn. Assuming a video frame rate of 60 Hz and 4 simultaneous users and an immediate switchover, a theoretical maximum frame sampling rate for each user would be 15 frames per second which is an adequate sampling rate for the purposes of KVM-via-IP equipment. However, in practice this theoretical maximum will not be achieved. The different incoming video signals may be at very different resolutions and are not synchronised with each other.

A typical sampler will contain phase locked loop (PLL) circuits that are used to sample the pixels of the incoming video signals and the PLLs will run at very different frequencies for different incoming video signals. It will typically take several frames for such PLLs to accurately settle after a change of video input from, say, a low input video resolution to a high input video resolution. It is desirable to sample a video signal accurately almost immediately after switchover and several frames delay would reduce the performance of the system.

For example, consider the case where the PLLs require 4 frame times to settle. Then, a theoretical maximum frame sampling rate given 60 Hz input video and 4 simultaneous users would be 3 frames per second which is less than the theoretical 15 frames per second maximum.

In one embodiment, the sampler comprises a programmable Phase Locked Loop (PLL). The programmable PLL can be programmed at each switchover between video sources so that a quicker lock can be achieved improving the performance of the video switch.

In another embodiment, the programmable Phase Locked Loop provides a fast lock mode. A fast lock mode is used to facilitate the fastest possible lock time. This allows a PLL lock state to be guaranteed within the Vsync pulse, a characteristic which makes a practical implementation simpler to engineer.

In another embodiment, the controller is adapted to monitor the Horizontal Synchronisation signal and the vertical synchronisation signal in the video data and to use this to establish the settings for the programmable phase locked loop. The horizontal and vertical sync pulses from each of the video inputs are monitored so that a record can be kept of the video modes. The PLL settings associated with an incoming video mode can then be re-applied the next time that the same incoming video is selected.

It will be readily appreciated that the incoming video signals are unlikely to be synchronised to each other. In KVM-via-IP systems it is advantageous to sample video frames starting at the top (first) horizontal line. Sampling the video frame starting in the middle of the picture is also a possible strategy by counting the horizontal sync pulses and has some advantages in terms of sampling speed. However, this approach is less ideal from a video point of view as the frame update at the viewer will tend to exhibit observable horizontal discontinuities caused by the different points at which the frame sampling starts. It is therefore advantageous to adopt a strategy that enables the video frame to be sampled starting at the beginning of the top horizontal line of pixels and ending the end of the bottom horizontal line of pixels.

Given that the frames are sampled starting at the beginning of each frame and that the frames from different video sources are not synchronised, it can be seen that, on average, if switching to a random video source, the system will have to wait for half a frame before sampling video data. This reduces the maximum video sampling rate from 15 in the example given above to 10.

However, in one embodiment, the controller is adapted to control the video switch and the sampler dependent upon the relative timing of Vertical Synchronization signals in the video data. The selection of the next video input may be adaptive because there is no necessity to sample the video signals in a given sequence provided that all the video signals are sampled in a timely manner. In this embodiment the performance of the system is improved by monitoring the vertical synchronisation signals (vsyncs) from each video source and attempting to choose the most efficient sampling sequence. As discussed above, in some embodiments, the invention is able to guarantee a PLL lock within the vsync period and so one simple strategy is to look for first vsync start from a group to video sources to be sampled. This simple strategy, when applied to the example previously described enables sampling rates somewhere between the 10 samples per second achievable using a simple sampling strategy (i.e. not analysing the vsyncs) and the 15 samples per second achievable in the ideal case. A sampling rate in this example of around 12 samples per second could be predicted on average, giving a 20 percent performance improvement which is useful.

In a further embodiment the video switch further comprises a first frame buffer and a second frame buffer for storing video data from the sampler, wherein each frame buffer has a capacity sufficient to store a frame of a video source for the maximum number of simultaneous users. This allows the same pair of frame buffers to be used simultaneously for all the video sources.

It will be appreciated that the features of the above described embodiments may be combined.

According to another aspect of the invention, the video switch discussed above may form part of a Keyboard, Video and Mouse switch.

According to another aspect of the invention there is provided a method of sampling a predetermined number of simultaneous video sources, which is at least two, using a switch and less samplers than the predetermined number of simultaneous video sources, the method comprising:
controlling the switch and one sampler to sample at least two of the simultaneous video sources by repeating the following:
selecting a video source that has not yet been sampled with the switch;
sampling a frame of the selected video source with the one sampler;
repeating the selecting and sampling until all of the at least two video sources have been sampled.

The method may further comprise storing data of the video mode for each video source; wherein, in the sampling, the one sampler is programmed with the stored data of the video mode.

The video mode may be determined by analysing the horizontal synchronisation signals and the vertical synchronisation signals in the video data.

In the selecting, vertical synchronisation signals of all the video sources remaining to be sampled may be analysed and a video source with the least time until a vertical synchronisation signal may be selected.

According to another aspect of the invention, there is provided a computer program comprising code means that, when executed by a computer system, instructs the computer system to perform the method described above.

According to another aspect of the invention, there is provided a computer program product comprising a computer readable medium bearing a computer program as described above.

BRIEF DESCRIPTION OF DRAWINGS

The present invention is illustrated by way of example, and not by way of limitation, in the figures of the accompanying drawings in which like reference numerals refer to similar elements and in which.

DETAILED DESCRIPTION OF THE INVENTION

Figure 1:
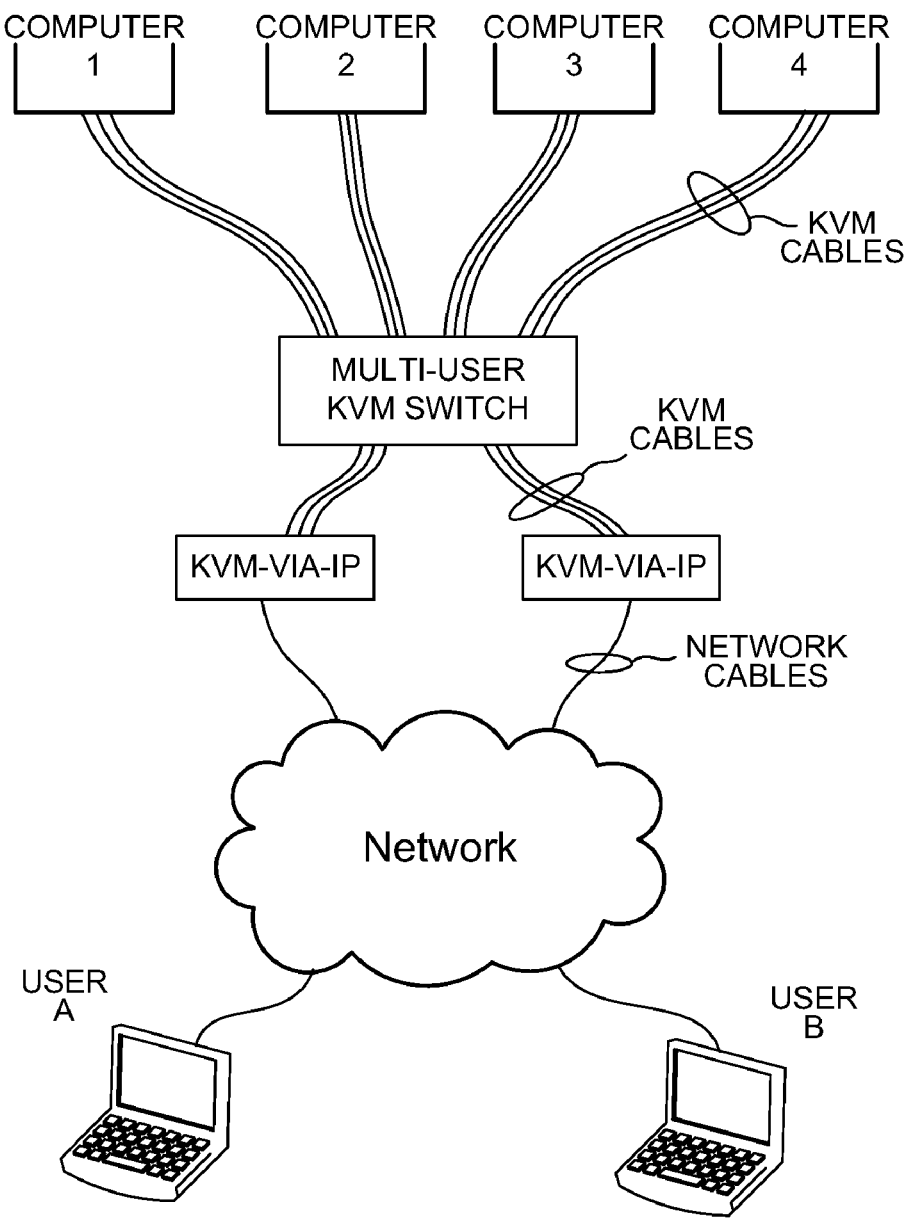
FIG. 1 depicts a typical arrangement of a prior art KVM-via-IP appliance connected to a multi-user KVM switch.
Figure 2:
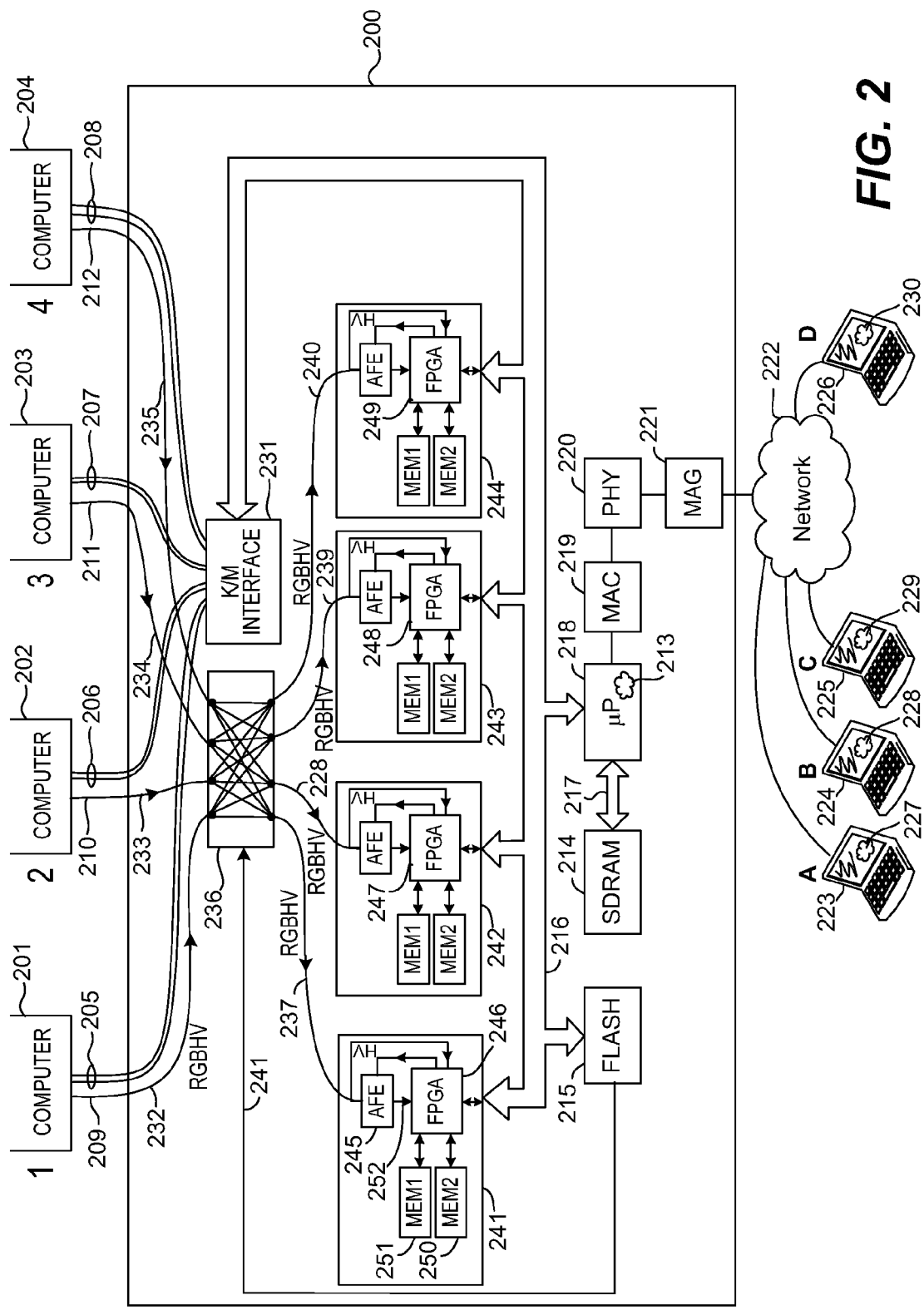
FIG. 2 depicts a conceptual structure of a prior art IP-enabled multi-user KVM switch.
Figure 3:
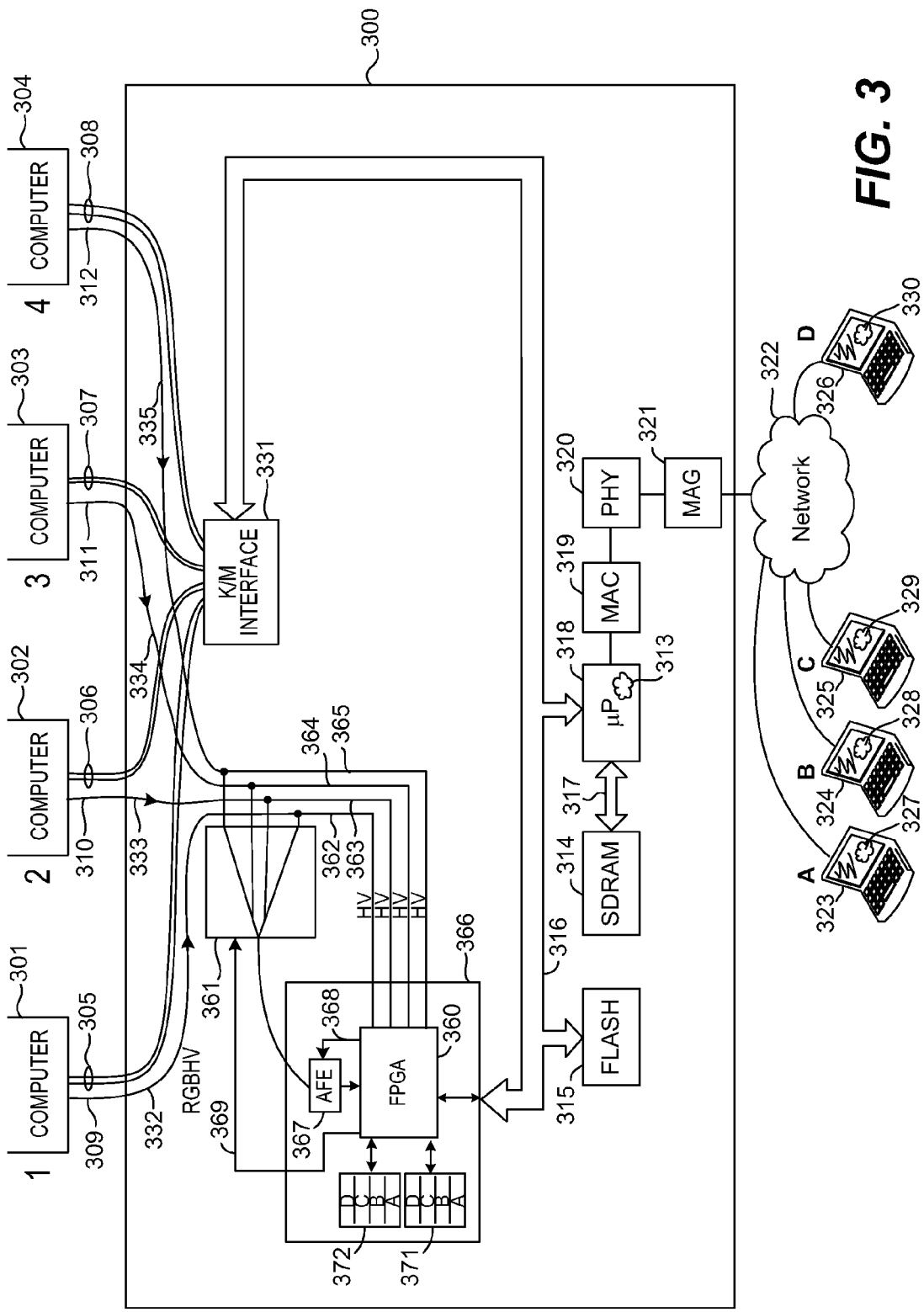
FIG. 3 is a conceptual block diagram of aspects of the preferred embodiment of the invention.

FIG. 3 depicts a conceptual block diagram of a preferred embodiment of the present invention applied to a KVM switch. The preferred embodiment of the invention also includes a local keyboard, monitor and mouse port with an associated on screen display circuit for attaching a local KVM console to the switch. The circuitry required to implement such functions is well known and so is not included in FIG. 3 for sake of clarity. FIG. 3 is arranged visually so that it can be compared with the structure of prior art multi-user IP-enabled KVM switches shown in FIG. 2.

The invention 300 is a multi-user IP-enabled KVM switch supporting four simultaneous users (A, B, C, D) and four computers. It can be readily appreciated that the number of supported computers can be expanded to eight, sixteen, thirty two or more by adding more video switching and interfacing circuitry. The number of simultaneous users could be two, three or four. More than four simultaneous users could also be theoretically supported by a single AFE using a rapid switching strategy but the performance reduction makes more than four users an unattractive arrangement. Experiments have shown that the performance levels achievable using a rapid switching strategy with two simultaneous users are excellent, with three users performance levels are good and with four users performance levels are acceptable. Above four users, performance levels are increasingly poor, although this does depend critically on the video change activity on each user's screen.

The preferred embodiment of the invention 300 is connected to multiple computers 301-304 via keyboard/mouse cables 305-308 and video cables 309-312. A central Intel® XScale® microprocessor 313 is in communication with a flash memory 315 and SDRAM memory 314 via busses 316 and 317 in a conventional manner. A Media Access Control circuit (MAC) 319 (provided as part of the XScale® processor), a Physical layer device (PHY) 320 and magnetics 321 are used to interface the microprocessor with the Ethernet network 322 that in turn is connected to computers 323 to 326 in a typical arrangement. The microprocessor reads its program data out of the flash memory and executes an embedded Linux operating system and a VNC server program 318 utilising SDRAM memory 314 and arranged to support multiple independent sessions viewers. The server program communicates with VNC client viewer software 327-330 running on remote computers 323-326 in a manner that enables keyboard, video and mouse signals to be transferred between the server software and the client software. It can readily be appreciated that the VNC server and VNC client software programs could be exchanged with other proprietary server and viewer software programs for other implementations. The preferred embodiment of the invention supports VNC client (viewer) software or Java based web browser style viewers in a similar way to the way that these dual styles of viewer are supported on the AdderLink IP commercially available from Adder Technology Limited.

The microprocessor 313 is in communication with a keyboard and mouse signalling circuit 331 via bus 316. This circuit is implemented using a Xilinx Spartan FPGA. The circuit is arranged so that keyboard and mouse data can be sent to each of the computers (1,2,3,4) from the microprocessor 313 in a manner that appears to be simultaneous from the point of view of the users A, B, C and D. This is achieved because bus 316 is much faster than the keyboard and mouse data and so the data for users A, B, C and D may be sent sequentially over bus 316 without noticeable delay.

The red, green and blue analogue colour signals and their associated horizontal and vertical synchronisation signals (332-335) are supplied from each computer 301-304 to video switching circuit 361. By comparison with FIG. 2, it may be noticed that this is a simple single output video switching circuit rather than a complex cross-point switch 236. Additionally, the horizontal and vertical synchronisation signals from each of the incoming video signals (362-365) are presented to the FPGA 360 within the video processing engine 366. For implementations with more than 4 computers, a simple digital switch, implemented by logic in an FPGA or similar, may be used to route the hsync and vsync signals of computers currently being controlled, to the FPGA 360.

This embodiment uses the Intersil ISL980001 Analogue Front End chip 367 as this has a number of useful features that can be used to advantage. The useful features include a "fast lock" mode that enables the digital PLL to seek its target frequency more quickly at the expensive of lower stability. This can be utilised to seek the desired frequency as fast as possible and then switched off during capture when stability is required. There are also some features that enable the numerical values of the registers controlling the PLL to be read. These values may in turn be applied to the PLL to set it up to be very close to its intended target frequency if the PLL settings for that target frequency are known. These features combined mean that it is possible to very rapidly switch the AFE from accurately capturing a first video signal to accurately capturing a second video signal of different frequency and characteristics.

Figure 4:
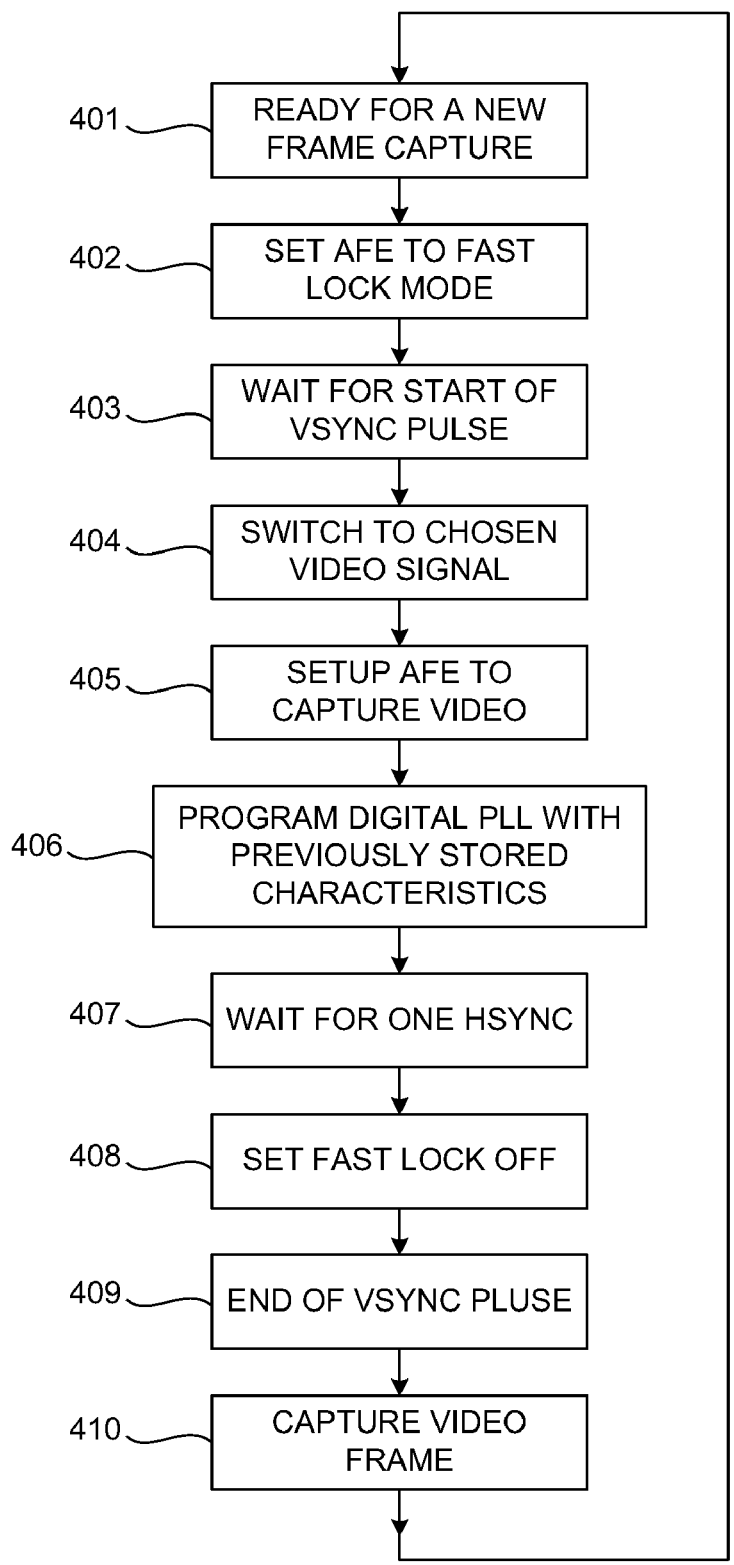
FIG. 4 is a flow diagram of the preferred video capture sequence for use with the embodiment of FIG. 3.

FIG. 4 is a flow diagram of the preferred video capture sequence. When a new frame capture is required, a fast 400 kHz i2c bus message is sent from the FPGA 360 to the Intersil AFE 367 instructing the AFE to go into fast lock mode 402. The FPGA stores a list of the video signals that it needs to sample in the next sampling phase. The FPGA looks at the vsync pulses from each of the incoming video signals (362-365). When it sees the start of the vsync period 403 for one of the signals that it is interested in, it sends a signal 369 to the video switch 361 to switch the AFE's incoming video 370 to this video signal (404). The horizontal and vertical synchronisation signals 362-365 from each of the video sources are fed into the FPGA 360 which counts the number of hsyncs in a vsync and the number of vsyncs per second. Using this information, the microprocessor 313 is able to determine, by means of a lookup table, the values that need to be loaded into the AFE 367 for in order to capture each of the four video signals. For each of the video mode values stored in the lookup table, an associated set of PLL register values are stored. These values may be pre-determined by arranging an AFE to capture a reference video signal and then reading out the values of the registers associated with the PLL. The microprocessor pre-loads the video capture and PLL settings into the FPGA so that they can be communicated as quickly as possible to the AFE once a Vsync start has been detected. The video capture settings and the PLL settings are sent to the AFE 367 from the FPGA 360 in steps 405 and 406. A wait for a horizontal sync pulse is added in step 407 to ensure that the lock has stabilised. A further i2c bus message is sent at step 408 to switch the fast lock off and ensure that the PLL is sufficiently stable to capture the video. The video capture 410 starts after the end of the vsync pulse 409. At this point the PLL frequency and stability will be sufficient to ensure a clean capture of the video pixel data. When the frame capture is complete the system is ready to capture the next frame.

The FPGA transfers captured digital pixel data into a selected one of the memories 371 or 372 whilst comparing the data with the video data previously sampled, which is held in the other memory 371,372. Each memory is subdivided into four sections, each of which holds video pixel data associated with a different video signal (332-335). If the new pixel data is being written into memory 372A then it will be compared with memory 371A to determine differences between successive frame captures. Similarly, if the new pixel data is being written into memory 372B then it will be compared with memory 371B to determine differences between successive frame captures. The VNC server software 318 runs in a similar way to the VNC software that currently runs on the Adder-Link IP product. This currently can service 4 remote users sessions but the same video is transmitted to all the remote sessions. The invention enables the VNC server software to see four sets of video pixel data in memories 371 and 372 and consequently to deliver these different video images independently to users A, B, C and D.

The microprocessor is able to control which video is delivered to which user and to route keyboard and mouse data arriving from a remote user to the appropriate computer (1,2,3 or 4) via bus 316 and interface circuit 331. The VNC server software includes features that enable the user to select the computer that they wish to control from a list. In this way, the complete system enables each of the users to independently select and control any of the computers. This is the functionality that is required from a multi-user IP enabled KVM switch.

The embodiment employs several techniques to ensure optimal video capture performance. The performance reduces as more video sources are sampled due to increased capture latency. Therefore if less than four remote sessions are active then fewer than four video sources will be sampled in order to maximise performance. If only one remote session is active then no switching of the video source will occur. The microprocessor will inform the FPGA of the video sources that need to be sampled but the FPGA makes an instantaneous decision about the order that these sources are sampled in order to minimise the time taken to sample all the sources. It does this by sampling the video source whose vsync start signal is detected first. After this capture is complete, it looks for the first vsync start signal from the remaining video signals that need to be sampled. This process continues until only one video source remains which is then sampled at the start of its next vsync period. Other more sophisticated sampling sequence strategies may be employed but the strategy outlined above may be implemented in an FPGA in a straightforward manner and has been found to give a useful performance improvement of 20%.

Although the keyboard/mouse interface circuit 331 and the FPGA 360 are shown in FIG. 3 as separate blocks for clarity of description, in this embodiment they are implemented as circuits within a common FPGA device for cost reduction reasons.

The present invention allows an AFE, or more specifically the sampler, or video capture circuit, to be shared between more than one user. This simplifies the hardware compared to prior-art devices, resulting in reduced hardware cost and complexity and improved power efficiency.

It will be appreciated the although the preferred embodiment has been described in terms of a keyboard, video and mouse switch, the novel and inventive aspects of the construction relate to a video switch. The present invention can equally be applied to a video switch as well as a Keyboard, video and mouse switch.

Although the description of the preferred embodiment has described the use of one AFE, it will be appreciated that the principles of the present invention can also be applied when there is more than one AFE, allowing more simultaneous users to be supported or offering improved performance with the same number of simultaneous users.

It will also be appreciated that in alternate embodiments the invention may applied to digital video signals, for example those transmitted using a Digital Video Interface (DVI) or High Definition Multimedia Interface (HDMI) connection. The construction of these embodiments is similar to the construction described above but the AFE is replaced with a suitable digital video receiver. For example, when used with a DVI interface the AFE of the above described embodiments may be replaced with a DVI receiver. One example of a suitable DVI receiver IC is the Silicon Image SiI1161, commercially available from Silicon Image, Inc.

Although the foregoing description of embodiments is what is believed to be the most practical and preferred embodiments, they are not intended to limit the invention to the precise form described. Variations will suggest themselves to those skilled in the art and may be used without departing from the spirit and scope of the invention. It is thus intended that the scope of the invention not be limited by this detailed description, but rather by the scope of the following claims.

We claim:

1. A video switch for allowing at least two simultaneous users to view video data on respective remote devices from respective ones of at least two video sources; wherein the video switch comprises:
   a switch for selecting one of the respective ones of the at least two video sources;
   at least one sampler connected to the switch for sampling video data from the at least two video sources;
   a controller adapted to control the switch and the sampler to select one of the at least two video sources considering a relative timing of vertical synchronization signals in the video data and sample a frame of the video data from the selected video source before selecting another one of the at least two video sources; and
   a network interface configured to transmit respective video data to at least two simultaneous users for viewing on respective displays, wherein the output supports a maximum number of simultaneous users, which is at least two, and the number of samplers in the video switch is less than the maximum number of simultaneous users.

2. A video switch according to claim 1, wherein the sampler comprises a programmable Phase Locked Loop.

3. A video switch according to claim 2, wherein the programmable Phase Locked Loop provides a fast lock mode.

4. A video switch according to according to claim 2, wherein the controller is adapted to monitor the Horizontal Synchronisation signal and the vertical synchronisation signal in the video data and to use this to establish the settings for the programmable phase locked loop.

5. A video switch according to claim 1, wherein the controller is adapted to control the video switch and the sampler dependent upon the relative timing of Vertical Synchronization signals in the video data.

6. A video switch according claim 1, wherein the switch is a single output switch.

7. A video switch according to claim 1, comprising a single sampler.

8. A video switch according to claim 1, further comprising a first frame buffer and a second frame buffer for storing video data from the sampler, wherein each frame buffer has a capacity sufficient to store a frame of a video source for the maximum number of simultaneous users.

9. A keyboard, video and mouse switch comprising a video switch according to claim 1.

10. A method of allowing at least two simultaneous users to view video data on respective remote devices from respective ones of at least two simultaneous video sources, using a switch and one sampler, the method comprising:
controlling the switch and the one sampler to sample the respective ones of the at least two simultaneous video sources by repeating the following:
selecting a video source that has not yet been sampled with the switch considering a relative riming of vertical synchronization signals in the video data;
sampling a frame of the selected video source with the one sampler;
repeating the selecting and sampling until all of the respective ones of the at least two video sources have been sampled; and
transmitting respective video data from the sampling step to the at least two simultaneous users through a network interface that supports at least two simultaneous users.

11. A method according to claim 10, further comprising:
storing data of a video mode for each video source;
wherein, in the sampling, the one sampler is programmed with the stored data of the video mode.

12. A method according to claim 11, wherein the video mode is determined by analysing the horizontal synchronisation signals and the vertical synchronisation signals in the video data.

13. A method according to claim 10 wherein, in the selecting, vertical synchronisation signals of all the video sources remaining to be sampled are analysed and a video source with the least time until a vertical synchronisation signal is selected.

14. A computer program product comprising a computer-readable medium having computer-executable instructions recorded thereon for enabling a processor of a computer system to allow at least two simultaneous users to view video data on respective remote devices from respective ones of at least two simultaneous video sources, wherein the computer system comprises a switch and one sampler, the computer executable instructions comprising:
controlling the switch and the one sampler to sample the respective ones of the at least two simultaneous video sources by repeating the following:
selecting a video source that has not yet been sampled with the switch considering a relative timing of vertical synchronization signals in the video data;
sampling a frame of the selected video source with the one sampler;
repeating the selecting and sampling until all of the respective ones of the at least two video sources have been sampled; and
transmitting respective video data from the sampling step to the at least two simultaneous users through a network interface that supports at least two simultaneous users.

* * * * *